United States Patent [19]

Crochiere et al.

[11] Patent Number: 5,664,011
[45] Date of Patent: Sep. 2, 1997

[54] ECHO CANCELLER WITH ADAPTIVE AND NON-ADAPTIVE FILTERS

[75] Inventors: Ronald Eldon Crochiere, Berkeley Heights, N.J.; Vasu Iyengar, Allentown, Pa.

[73] Assignee: Lucent Technologies Inc., Murray Hill, N.J.

[21] Appl. No.: 519,267

[22] Filed: Aug. 25, 1995

[51] Int. Cl.$^6$ .............................. H04M 9/08; H04B 3/23
[52] U.S. Cl. ..................... 379/410; 379/406; 379/407; 379/411
[58] Field of Search .................... 379/410, 406, 379/407, 411, 412; 370/32.1

[56] References Cited

U.S. PATENT DOCUMENTS

| | | | |
|---|---|---|---|
| 4,564,934 | 1/1986 | Macchi | 370/32 |
| 4,903,247 | 2/1990 | Van Gerwen et al. | 367/135 |
| 5,146,494 | 9/1992 | Harman | 379/411 |
| 5,263,020 | 11/1993 | Yatsuzuka et al. | 379/406 |
| 5,371,789 | 12/1994 | Hirano | 379/410 |
| 5,390,250 | 2/1995 | Janse et al. | 379/410 |
| 5,414,766 | 5/1995 | Cannalire et al. | 379/410 |
| 5,428,605 | 6/1995 | André | 379/410 |
| 5,463,618 | 10/1995 | Furukawa et al. | 379/410 |

OTHER PUBLICATIONS

Ochiai et al, "Echo Canceler with Two Echo Path Models" *IEEE Transactions On Communications*, vol. COM-25, No. 6, Jun. 1977, pp. 589–595.

Messerschmitt, "Echo Cancellation in Speech and Data Transmission",*IEEE Journal on Selected Areas in Communications*, vol. SAC-2, No. 2, Mar. 1984, pp. 283–298.

Tao et al, "A Cascadable VLSI Echo Canceller", *IEEE Journal on Selected Areas in Communications*, vol. SAC-2, No. 2, Mar. 1984, pp. 298–303.

*Primary Examiner*—Krista M. Zele
*Assistant Examiner*—Jacques M. Saint-Surin
*Attorney, Agent, or Firm*—David Sigmond; David L. Smith

[57] ABSTRACT

An echo canceller includes receive and send paths each having an input and output port, a first non-adaptive filter with first filter coefficients for generating a first replica signal in response to a receive input signal, a second adaptive filter with second filter coefficients for generating a second replica signal in response to the receive input signal, a first subtracter for generating a send output signal representing a difference between a send input signal and the first replica signal, a second subtracter for generating an error signal representing a difference between the send output signal and the second replica signal, and a controller for replacing the first filter coefficients by the sum of the first and second filter coefficients and for resetting the second filter coefficients in response to a calculation that includes a first quantity associated with the send output signal and a second quantity associated with the error signal.

27 Claims, 2 Drawing Sheets

ECHO CANCELLER WITH ADAPTIVE AND NON-ADAPTIVE FILTERS

FIELD OF THE INVENTION

The invention relates generally to echo cancellers, and more particularly to echo cancellers with at least two filters.

BACKGROUND OF THE INVENTION

Speech typically results in reflected waves. When the reflected wave arrives a very short time after the direct sound, it is perceived as a spectral distortion or reverberation. However, when the reflection arrives a few tens of milliseconds after the direct sound, it is heard as a distinct echo. Such echoes may be annoying, and under extreme conditions can completely disrupt a conversation.

Line echoes (i.e., electrical echoes) occur in telecommunications networks due to impedance mismatches at hybrid transformers that couple two-wire local customer loops to four-wire long-distance trunks. Ideally, the hybrid passes the far-end signal at the four-wire receive port through to the two-wire transmit port without allowing leakage into the four-wire transmit port. However, this would require exact knowledge of the impedance seen at the two-wire ports, which in practice varies widely and can only be estimated. As a result, the leaking signal returns to the far-end talker as an echo. The situation can be further complicated by the presence of two-wire toll switches, allowing intermediate four-two-four wire conversions internal to the network. In telephone connections using satellite links with round-trip delays on the order of 600 ms, line echoes can become particularly disruptive.

Acoustic echoes occur in telecommunications networks due to acoustic coupling between a loudspeaker and a microphone (e.g., in a speakerphone). During a teleconference, where two or more parties are connected by a full-duplex link, an acoustic reflection of the far-end talker through the near-end conference room is returned to the far-end talker as an echo. Acoustic echo cancellation tends to be more difficult than line echo cancellation since the duration of the acoustic path is usually several times longer (100–400 ms) than typical electrical line paths (20 ms), and the acoustic path may change rapidly at any time due to opening doors, moving persons, changing temperatures, etc.

Echo suppressors have been developed to control line echoes in telecommunications networks. Echo suppressors decouple the four-wire transmit port when signal detectors determine that there is a far-end signal at the four-wire receive port without any near-end signal at the two-wire receive port. Echo suppressors, however, are generally ineffective during double-tang when speakers at both ends are talking simultaneously. During double-talk, the four-wire transmit port carries both the near-end signal and the far-end echo signal. Furthermore, echo suppressors tend to produce speech clipping, especially during long delays caused by satellite links.

Echo cancellers have been developed to overcome the shortcomings of echo suppressors. Echo cancellers include an adaptive filter and a subtracter. The adaptive filter attempts to model the echo path. The incoming signal is applied to the adaptive filter which generates a replica signal. The replica signal and the echo signal are applied to the subtracter. The subtracter subtracts the replica signal from the echo signal to produce an error signal. The error signal is fed back to the adaptive filter, which adjusts its filter coefficients (or taps) in order to minimize the error signal. In this manner, the filter coefficients converge toward values that optimize the replica signal in order to cancel (i.e., at least partially offset) the echo signal. Echo cancellers offer the advantage of not disrupting the signal path. Economic considerations place limits on the fineness of sampling times and quantization levels in digital adaptive filters, but technological improvements are relaxing these limits. Echo cancellers were first deployed in the U.S. telephone network in 1979, and currently are virtually ubiquitous in long-distance telephone circuits. See generally Messerschmitt, "Echo Cancellation in Speech and Data Transmission", *IEEE Journal on Selected Areas in Communications*, Vol. SAC-2, No. 2, March 1984, pp. 283–298; and Tao et al., "A Cascadable VLSI Echo Canceller", *IEEE Journal on Selected Areas in Communications*, Vol. SAC-2, No. 2, March 1984, pp. 298–303.

In order for the adaptive filter to correctly model the echo path, the output signal of the echo path must originate solely from its input signal. During double-talking, speech at the near-end that acts as uncorrelated noise causes the filter coefficients to diverge (or drift). In open-loop paths, coefficient drift is usually not catastrophic although a brief echo may be heard until convergence is established again. In closed-loop paths (which typically include acoustic echo paths), however, coefficient drift may lead to an unstable system which causes howling and makes convergence difficult. To alleviate this problem, double-talk detectors are commonly used for disabling the adaptation during double-talking. Double-talk detectors may employ, for instance, Geigel's test to detect double-talking. Unfortunately, double-talk detectors fail to indicate the presence of double-talking for a time period (e.g., a whole syllable) after double-talking begins. During this time period, the coefficients may drift and lead to howling as mentioned above. Furthermore, double-talking becomes increasingly difficult to detect as an acoustic echo becomes large in comparison to the near-end signal.

An adaptive echo canceller arranged for overcoming the double-talking problem is proposed in Ochiai et al., "Echo Canceler with Two Echo Path Models", *IEEE Transactions On Communications*, Vol. COM-25, No. 6, June 1977, pp. 589–595. Ochiai et al. discloses a parallel filter arrangement with a programmable foreground filter and an adaptive background filter. Each of the filters generates a replica of the echo signal. The filter coefficients of the foreground filter are replaced by those of the background filter when the replica signal from the background filter provides a better estimate of the echo signal than the replica signal of the foreground filter. Therefore, during uncorrelated double-talking, the foreground filter is relatively immune from coefficient drift in the background filter. There are, however, drawbacks to this approach. First, in the event the filter coefficients of the background filter drift into an unstable state and are subsequently cleared, there may be a relatively long delay before the background filter works back to providing a better replica signal than the foreground filter. As a result, the convergence time for the foreground filter may be significantly delayed. Secondly, the filter coefficients of the background filter may converge to provide good cancellation for narrowband signals (i.e., a narrow range of frequencies), but poor cancellation outside this frequency range. In this instance, the background filter may provide the foreground filter with an undesirable update.

Based on the foregoing, there is a need for an echo canceller which protects against double-talking, provides rapid convergence, and has robustness to narrowband signals.

SUMMARY OF THE INVENTION

An embodiment of the invention is an echo canceller which provides excellent echo cancellation performance with rapid convergence, robustness to double-talking and channel noise disturbances, and/or robustness to narrowband signals.

In accordance with one aspect of the invention, an echo canceller includes receive and send paths, with each including an input and output port. The echo canceller is adapted to cancel an echo between the receive output port and the send input port. The echo canceller also includes a first non-adaptive filter with first filter coefficients for generating a first replica signal in response to a receive input signal, a second adaptive filter with second filter coefficients for generating a second replica signal in response to the receive input signal, a first subtracter for generating a send output signal representing a difference between a send input signal and the first replica signal, a second subtracter for generating an error signal representing a difference between the send output signal and the second replica signal, and a controller for replacing the first filter coefficients by the sum of the first and second filter coefficients and for resetting the second filter coefficients in response to a calculation that includes a first quantity associated with the send output signal and a second quantity associated with the error signal. Preferably, the first filter coefficients are modified solely by replacing the first filter coefficients by the sum of the first and second filter coefficients.

In accordance with another aspect of the invention, the controller includes a spectral detector for determining when the receive input signal is a narrowband signal in order to prevent updating the first filter coefficients in response to a narrowband signal.

BRIEF DESCRIPTION OF THE DRAWING

The invention, together with its various features and advantages, can be readily understood from the following detailed description taken in conjunction with the accompanying drawing, in which.

DETAILED DESCRIPTION

Figure 1:
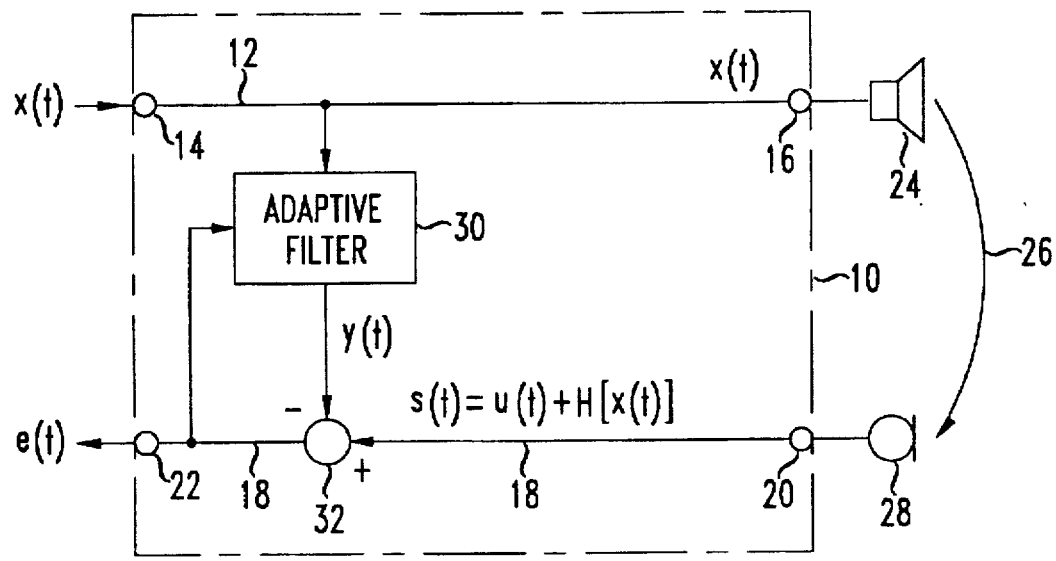
FIG. 1 is a schematic diagram illustrating the manner in which an echo canceller is generally used as part of a loudspeaking telephone set.

FIG. 1 shows a simplified schematic diagram illustrating the manner in which an echo canceller is generally used as part of a loudspeaking telephone set. Echo canceller 10 includes a receive path 12 with receive input port 14 and receive output port 16, and send path 18 with send input port 20 and send output port 22. A receive input signal x(t), representing a far-end signal, is applied to receive input port 14. Receive input signal x(t) is coupled via path 14 to receive output port 16, which couples signal x(t) to loudspeaker 24. Acoustic echo path 26 with transfer characteristic H[t] is located between loudspeaker 24 and microphone 28. Echo path 26 causes signal x(t) at loudspeaker 24 to appear as echo signal H[x(t)] at microphone 28. Microphone 28 also generates near-end signal u(t) due to speech at the near-end. Therefore, microphone 28 generates send input signal s(t) consisting of near-end signal u(t) added to echo signal H[x(t)] by way of superposition. Echo canceller 10 further comprises adaptive digital transversal filter 30 and subtracter 32. Adaptive filter 30 has a finite impulse response (FIR), and its filter coefficients are adaptively updated to model the transfer characteristic H[t] at sample intervals. Adaptive filter 30 synthesizes a replica signal y(t) as an estimate of the undesired echo signal H[x(t)] in response to receive input signal x(t). Subtracter 32 subtracts replica signal y(t) from send input signal s(t) to form error signal e(t). Error signal e(t) is coupled to send output port 22 to provide the send output signal. Error signal e(t) is also fed back to adaptive filter 30. Error signal e(t) can be described as follows:

$$e(t)=u(t)+[H[x(t)]-y(t)]$$

From this expression, it is clear that signal e(t) represents near-end signal u(t) when replica signal y(t) is a reliable estimate of echo signal H[x(t)].

Generally, the transfer characteristic H[t] of echo path 26 will be time-varying. Echo signal H[x(t)] approximates the linear convolution of signal x(t) with the impulse response h(t) of echo path 26. Therefore, adaptive filter 30 adjusts its impulse response w(t) as best it can to match impulse response h(t). The adaptive adjustment of filter 32 is controlled by error signal e(t). This adaptive adjustment is continued as long as there is a correlation between error signal e(t) and receive input signal x(t). When receive input signal x(t) is present and near-end signal u(t) is absent (i.e., far-end speech without near-end speech), adaptive filter 30 generates replica signal y(t) as a reliable estimate of echo signal H[x(t)]. When, however, both x(t) and u(t) are present (i.e., double-talking), adaptive filter 30 can become grossly misadjusted due to near-end signal u(t) as a disturbing factor in error signal e(t). This misadjustment prevents replica signal y(t) from providing a reliable estimate of H[x(t)], in which case H[x(t)] is improperly or inadequately canceled.

Further discussion of echo cancellers appears in U.S. Pat. Nos. 5,390,250; 5,371,789; 5,263,020; 5,146,494; 4,903,247; 4,564,934; and in the articles by Ochiai et at., Messerschmitt, and Tao et al., supra, which are all incorporated herein by reference.

Since the present invention is best performed by a digital echo canceller, the following description will utilize discrete-time modeling. Discrete-time modeling can be obtained by assuming in FIG. 1 that signals x(t) and s(t) are applied to analog-to-digital converters before being applied to input ports 14 and 20, respectively, and likewise that signals x(t) and e(t) are received from digital-to-analog converters coupled to output ports 16 and 22, respectively, and further that all the relevant signals in echo canceller 10 are digital signals. These digital signals are denoted in a conventional manner so that, for example, x(k) denotes a quantized sample of continuous-time sample x(t) at instant t=kT, where 1/T is the sampling frequency at the appropriate (Nyquist) rate. Digital-to-analog and analog-to-digital converters may be employed for connecting the echo canceller 10 with analog channels.

Figure 2:
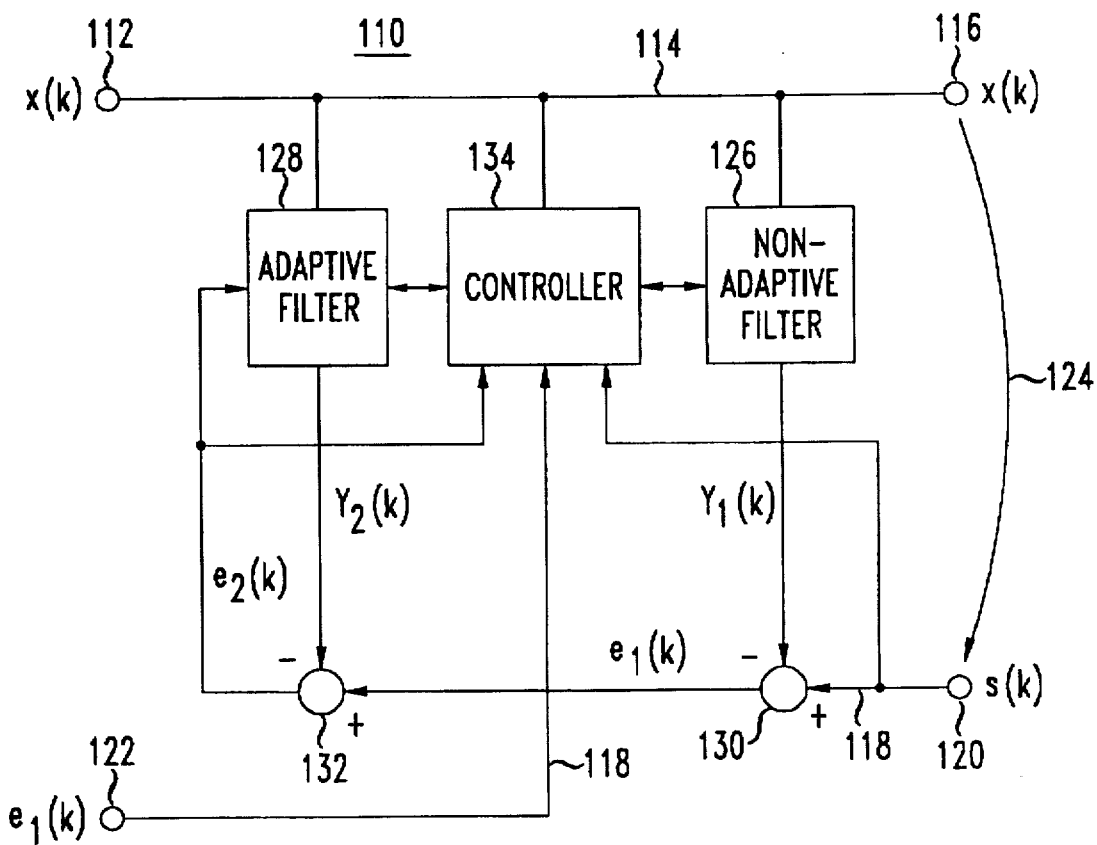
FIG. 2 is a schematic diagram illustrating an embodiment of an echo canceller according to the invention.

FIG. 2 shows a schematic diagram of one embodiment of the invention. Echo canceller 110 includes a receive path 112 with receive input port 114 and receive output port 116, and send path 118 with send input port 120 and send output port 122. Echo path 124 with transfer characteristic H[z] is disposed between receive output port 116 and send input port 120. A first non-adaptive filter 126 with first filter coefficients has an input port coupled to receive path 112, and a second adaptive filter 128 with second filter coefficients has an input port coupled to receive path 112. A first subtracter 130 has an addend input port coupled to send input port 120, a subtrahend input port coupled to an output port of filter 126, and an output port coupled to send output port 122. A second subtracter 132 has an addend input port coupled to send output port 122, a subtrahend input port coupled to an output port of filter 128, and an output port coupled to a feedback input port of filter 128. Thus, filters 126 and 128 are arranged in cascade with filter 126 in the foreground and filter 128 in the background. Filter 126 provides the actual echo cancellation for echo canceller 110 at output port 122. Filter 128 attempts to cancel whatever echo is not canceled by filter 126 in order to subsequently improve the performance of filter 126.

Controller 134 has input ports coupled to the output ports of subtracters 130 and 132. Controller 134 also has both input and output ports coupled to filters 126 and 128 for accessing the first filter coefficients of filter 126 and the second filter coefficients of filter 128. Controller 134 is used for replacing the first filter coefficients with the sum of the first and second filter coefficients when the combination of filter 126 and filter 128 provides better echo cancellation than filter 126 alone. Controller 134 performs this update operation by accumulating the second filter coefficients on related first filter coefficients, and then resetting the second filter coefficients. Controller 134 performs the update operation in response to a function determined at least by the levels of the outputs of the first and second subtracters. That is, when second subtracter 132 generates a smaller output signal than that of first subtracter 130, then the combination of filters 126 and 128 provides better echo cancellation than filter 126 alone, and the update operation improves the echo canceller's performance. After updating occurs, if the second filter coefficients are cleared, then echo cancellation provided by filter 126 is essentially identical to that provided by the combination of filters 126 and 128 before updating occurs. In addition, after updating occurs, adaptive filter 128 resumes its adaptive processing. As a result, the updating operation may be repeated as often as necessary to incrementally improve the echo cancellation at send output port 122.

Preferably, the first filter coefficients are modified solely by accumulation with the second filter coefficients. That is, filter 128 includes an adaptation processor, whereas filter 126 is devoid of an adaptation processor. The elimination of a separate adaptation processor for filter 126 reduces hardware requirements and provides for a more compact, efficient implementation. Furthermore, filter 126 becomes less susceptible to coefficient drift during uncorrelated double-talking.

In operation, receive input signal $x(k)$, representing a far-end signal, is applied to receive input port 114. Signal $x(k)$ is applied to filters 126 and 128, and to receive output port 116. Send input port 120 receives send input signal $s(k)$ consisting of near-end signal $u(k)$ added to echo signal $H[x(k)]$. Filter 126 generates a first replica signal $y_1(k)$, as an estimate of echo signal $H[x(k)]$, in response to signal $x(k)$. Likewise, filter 128 generates a second replica signal $y_2(k)$, as an estimate of echo signal $e_1(k)$, in response to signal $x(k)$. Subtracter 130 generates error signal $e_2(k)$, representing the difference between signals $y_1(k)$ and $s(k)$. Signal $e_1(k)$ is coupled to send output port 122. Subtracter 132 generates error signal $e_2(k)$, representing the difference between signals $y_2(k)$ and $e_1(k)$. Signal $e_2(k)$ is fed back to filter 128 for adaptive processing.

Controller 134 may employ any number of algorithms for determining whether to perform the update operation. For instance, controller 134 may update the first coefficients in response to a calculation that includes a first quantity associated with $e_1(k)$, and a second quantity associated with $e_2(k)$. The calculation, for example, may determine whether a ratio of the first quantity, representing a power of $e_1(k)$, to the second quantity, representing a power of $e_2(k)$, exceeds a predetermined threshold. The powers can be instantaneous signal powers of $e_1(k)$ and $e_2(k)$ averaged over a specific period of time.

Figure 3:
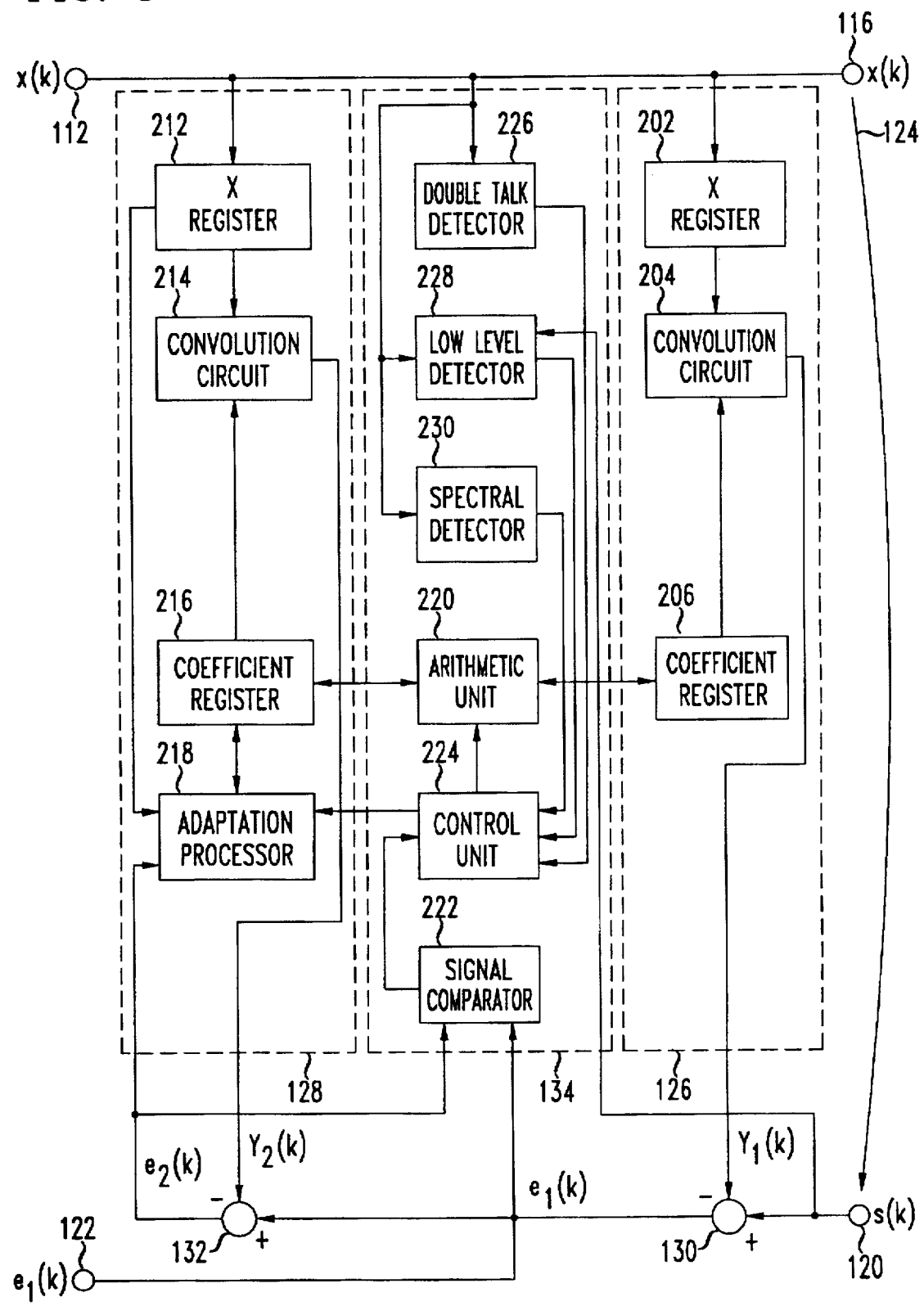
FIG. 3 is a schematic diagram illustrating an embodiment of the echo canceller of FIG. 2.

FIG. 3 shows a schematic diagram of an embodiment of FIG. 2. As is seen, non-adaptive filter 126 includes X register 202, convolution circuit 204, and coefficient register 206. Adaptive filter 128 includes X register 212, convolution circuit 214, coefficient register 216, and adaptation processor 218. X registers 202 and 212 each store N samples $x(k)$, $x(k-1)$, ... $x(k-N)$ of the input receive signal. The value of integer N is directly related to the delay of echo path 124. That is, N is selected for a sufficiently accurate representation of the impulse response of echo path 124. Coefficient register 206 provides a memory element for storing N first filter coefficients corresponding to the impulse response of filter 126, and coefficient register 216 provides a memory element for storing N second filter coefficients corresponding to the impulse response of filter 128. Registers 202, 206, 212 and 216 are each recirculated shift registers. Convolution circuit 204 generates replica signal $y_1(k)$ by performing linear convolution on the samples stored in X register 202 with the first filter coefficients stored in coefficient register 206. Likewise, convolution circuit 214 generates replica signal $y_2(k)$ by performing linear convolution on the samples stored in X register 212 with the second filter coefficients stored in coefficient register 216. If desired, X registers 202 and 212 can be combined into a single X register.

Adaptation processor 218 adaptively updates the second filter coefficients stored in coefficient register 216, in response to signals $x(k)$ and $e_2(k)$, in order to minimize the level of signal $e_2(k)$. Various adaptation algorithms for correcting the second filter coefficients are well known in the art. For instance, the Least Mean Square (LMS) algorithm is an iterative stochastic gradient algorithm that minimizes the expected value of the squared error signal. Various modifications of the LMS algorithm, such as the Normalized Least Mean Square (NLMS) algorithm are also suitable. Alternatively, the Least Squares (LS) algorithm provides a noniterative, block-oriented adaptation algorithm.

Coefficient register 206 is not coupled to adaptation processor 218. Instead, the first filter coefficients in coefficient register 206 are programmably updated by controller 134. During the update operation, the first filter coefficients in register 206, and the second filter coefficients in register 216 corresponding to the same tap positions as the first filter coefficients, are added together in arithmetic unit 220, and the sum is stored in register 206. In other words, the first tap in register 206 is replaced by the sum of the first tap in register 206 and the first tap in register 216, the second tap in register 206 is replaced by the sum of the second tap in register 206 and the second tap in register 216, and so on, up to the Nth tap in register 206 being replaced the sum of the Nth tap in register 206 and the Nth tap in register 216. Thereafter, arithmetic unit 220 clears the second filter coefficients in coefficient register 216. Signal comparator 222 determines whether updating is requested by comparing the levels of error signals $e_1(k)$ and $e_2(k)$ in accordance with a control algorithm. More particularly, signal Comparator 222 calculates whether a ratio of the instantaneous power of signal $e_1(k)$ to the instantaneous power of signal $e_2(k)$ exceeds a predetermined threshold value. If so, signal comparator 222 sends an update request signal to control unit 224, and (unless otherwise prevented) control unit 224 instructs arithmetic unit 220 to perform the update operation. For example, signal comparator 222 may calculate whether the power of signal $e_2(k)$ is less than $-20\log C$ dB the power of signal $e_1(k)$, where C is a positive constant of less than 1.

Signal comparator 222 also determines whether the second filter coefficients are drifting, and therefore need to be cleared, by comparing the levels of error signals $e_1(k)$ and $e_2(k)$ in accordance with another control algorithm. In this manner, controller 134 may reset the second filter coefficients, without updating the first coefficients, in response to a calculation that includes a first quantity associated with $e_1(k)$, and a second quantity associated with $e_2(k)$. The calculation, for example, may determine whether a ratio of the second quantity, representing a power of $e_2(k)$, to the first quantity, representing a power of $e_1(k)$, exceeds a predetermined threshold. The powers can be instantaneous signal powers of $e_2(k)$ and $e_1(k)$ averaged over a specific period of time. More particularly, signal comparator 222 calculates whether a ratio of the instantaneous power of signal $e_2(k)$ to the instantaneous power of signal $e_1(k)$ exceeds a predetermined threshold value. If so, signal comparator 222 notifies control unit 224, and control unit 224 instructs arithmetic unit 220 to clear coefficient register 216 without altering coefficient register 206. For example, signal comparator 222 may calculate whether the power of signal $e_1(k)$ is less than $-20\log C$ dB the power of signal $e_2(k)$, where C is a positive constant of less than 1.

Controller 134 provides additional protection by way of double-talk detector 226, low level detector 228, and spectral detector 230. Double-talk detector 226 detects when signals x(k) and s(k) are each above a threshold, indicating the presence of double-talking. Low-level detector 228 detects when signals x(k) and s(k) are each below a threshold, indicating the presence of an idle state. For example, detectors 226 and 228 may compare predetermined thresholds to instantaneous signal powers of x(k) and s(k) averaged over a specific period of time. Of course, detectors 226 and 228 would employ different calculations. Spectral detector 230 detects when signal x(k) has a narrow frequency distribution over a specific period of time. Detectors 226, 228 and 230 may each send a detection signal to control unit 224. Upon receiving a detection signal, control unit 224 instructs adaptation processor 218 to disable the adaptation operation, and control unit 224 prevents arithmetic unit 220 from performing the update operation (regardless of whether signal comparator 222 requests an update) until the detection signal is removed.

Thus, spectral detector 230 relates the updating operation to a frequency distribution of signal x(k). Preferably, spectral detector 230 utilizes a spectral flatness criterion to allow the updating operation to occur unless signal x(k) has been a narrowband signal for a predetermined time period. In this manner, spectral detector 230 allows signals with substantially flat frequency distributions to update the first filter coefficients, while isolating the first filter coefficients from narrowband signals. For instance, spectral detector 230 may determine whether x(k) has consisted of a single-tone for the immediately preceding 20 ms. If so, spectral detector 230 instructs control unit 224 to disable adaptation processor 218 and to not perform the update operation until signal x(k) is no longer a single-tone. Of course, other spectral flatness criterion may be used. For instance, spectral detector 230 may determine whether signal x(k) has consisted of a double-tone for some time period. Spectral detector 230 may be implemented, for example, by an adaptive FIR notch-filter with its initial filter coefficient set to 1. The notch-filter can include two additional filter coefficients for single-tone detection, or four additional filter coefficients for double-tone detection. Alternatively, spectral detector 230 may be implemented by a filter bank which detects an imbalance in the power levels of various frequency bands. Spectral detector 230 is particularly useful at start-up, when the adaptation processing begins and echo canceller 110 is least robust to narrowband signals.

It should be noted that spectral detector 230 does not prevent controller 134 from clearing the second filter coefficients when the ratio of the instantaneous power of signal $e_2(k)$ to the instantaneous power of signal $e_1(k)$ exceeds a predetermined threshold value, since this may result from x(k) being a narrowband signal. In this instance, controller 134 would clear the second filter coefficients without altering the first filter coefficients.

The use of high-precision filter coefficients (as opposed to low-precision filter coefficients) will improve the performance of echo canceller 110 at a cost of increased demand for memory and processing cycles. The use of high-precision filter coefficients is considered more important for adaptive filter 128 than for non-adaptive filter 126. Therefore, in order to conserve memory without unduly reducing performance, it may be desirable to implement the first filter coefficients with single-precision words (e.g., 16-bits) and the second filter coefficients with double-precision words (e.g., 32-bits).

An echo canceller according to the invention can advantageously be used in a loudspeaking telephone set. It is possible that a large portion of the echo path between the loudspeaker and the microphone is determined by the set itself, and therefore is known. Consequently, the echo path may be reasonably approximated by initially storing predetermined first filter coefficients into X register 202, or initially storing predetermined second filter coefficients into X register 212.

Several advantages of the present invention are now summarized. The use of a non-adaptive first filter, as compared to an adaptive first filter, provides better immunity to double-talking, reduces hardware complexity, reduces processor demands, and reduces power consumption. The provision of replacing the first filter coefficients by the sum of the first and second filter coefficients, instead of merely replacing the first filter coefficients by the second filter coefficients, provides for more rapid convergence of the first filter coefficients. Furthermore, the provision of a spectral detector provides greater robustness to narrowband signals. In addition, the use of single-precision words for the first filter coefficients and double-precision words for the second filter coefficients may provide for more efficient memory usage without unduly reducing performance.

It should, of course, be understood that while the present invention has been described in terms of several illustrative embodiments, other arrangements will be apparent to those of ordinary skill in the art. For example, while the embodiments of the invention have been described in reference to discrete functional elements, the function of one or more of these elements can be provided by one or more appropriately programmed general-purpose processors, or special-purpose integrated circuits, or digital signal processors, or an analog or hybrid counterpart of any of these devices. The invention is well suited for fabrication in a single VLSI integrated circuit chip. Finally, while the present invention has been described in reference to a particular system application, the inventive concept can be used in telephone channels including PSTN, ISDN and mobile communication networks, teleconferences including picture phones, video conferences, audio conferences, and virtually any application where echo cancellation is desired. Therefore, the invention should be limited only by the spirit and scope of the appended claims.

The invention claimed is:

1. An echo canceller comprising:
    a receive path and a send path each having an input port and an output port;
    a non-adaptive filter with first filter coefficients and an input port coupled to the receive path;
    an adaptive filter with second filter coefficients and an input port coupled to the receive path;
    a first subtracter with an addend input port coupled to the input port, a subtrahend input port coupled to an output port of the non-adaptive filter, and an output port coupled to the send output port;
    a second subtracter with an addend input port coupled to the send output port, a subtrahend input port coupled to an output port of the adaptive filter, and an output port coupled to a feedback input port of the adaptive filter; and
    a controller coupled to the output ports of the first and second subtracters, and coupled to the filters, for accumulating the second filter coefficients on the first filter coefficients and for resetting the second filter coefficients in response to signal levels at the output ports of the first and second subtracters.

2. The echo canceller of claim 1 in which the first filter coefficients are modified solely by accumulation with the second filter coefficients.

3. The echo canceller of claim 1 in which the resetting includes clearing the second filter coefficients.

4. The echo canceller of claim 1 in which after accumulating the second filter coefficients on the first filter coefficients and then resetting the second filter coefficients, the signal level at the output port of the first subtracter is essentially identical to what the signal level was at the output port of the second subtracter before the accumulating and resetting occurred.

5. The echo canceller of claim 1 in which the controller further includes a spectral detector coupled to the receive path, wherein the accumulating is dependent on a frequency distribution of a signal level at the receive path being within a spectral flatness criterion.

6. An echo canceller with a receive path between a receive input port and a receive output port, and a send path between a send input port and a send output port, the echo canceller being used for cancelling an echo signal at the send input port which occurs in response to a receive input signal, the echo canceller comprising:
    a first non-adaptive filter with first filter coefficients for generating a first replica signal, which is an estimate of the echo signal, in response to the receive input signal;
    a second adaptive filter with second filter coefficients for generating a second replica signal, which is an estimate of a send output signal, in response to the receive input signal;
    a first subtracter for generating the send output signal representing a difference between a send input signal and the first replica signal;
    a second subtracter for generating an error signal representing a difference between the send output signal and the second replica signal, and for applying the error signal to the second filter; and
    a controller for replacing the first filter coefficients by a sum of the first and second filter coefficients in corresponding tap positions and for resetting the second filter coefficients in response to a calculation that includes a first quantity associated with the send output signal and a second quantity associated with the error signal.

7. The echo canceller of claim 6 in which the first filter coefficients are modified solely by replacing the first filter coefficients by the sum of the first and second filter coefficients.

8. The echo canceller of claim 6 in which the first filter has an impulse response which is an estimate of an impulse response of an echo path between the receive output port and the send input port.

9. The echo canceller of claim 6 in which the second filter includes an adaptation processor for adaptively modifying the second filter coefficients in response to the receive input signal and the error signal.

10. The echo canceller of claim 6 in which the first and second filters are digital filters.

11. The echo canceller of claim 6 in which the controller is also for resetting the second filter coefficients without replacing the first filter coefficients when a ratio of the second quantity, representing a power of the error signal, to the first quantity, representing a power of the send output signal, exceeds a threshold.

12. The echo canceller of claim 6 in which the first filter coefficients are implemented in single-precision words and the second filter coefficients are implemented in double-precision words.

13. The echo canceller of claim 6, as part of an integrated circuit chip.

14. The echo canceller of claim 6, as part of a loudspeaking telephone set.

15. An echo canceller with a receive path between a receive input port and a receive output port, and a send path between a send input port and a send output port, the echo canceller being used for cancelling an echo signal at the send input port which occurs in response to a receive input signal, the echo canceller comprising:
    a first non-adaptive filter with first filter coefficients for generating a first replica signal, which is an estimate of the echo signal, in response to the receive input signal, the first filter including a first programmable filter coefficient memory for storing the first filter coefficients;
    a second adaptive filter with second filter coefficients for generating a second replica signal, .which is an estimate of a send output signal, in response to the receive input signal, the second filter including a second programmable filter coefficient memory for storing the second filter coefficients;
    a first subtracter for generating the send output signal representing a difference between a send input signal and the first replica signal;
    a second subtracter for generating an error signal representing a difference between the send output signal and the second replica signal, and for applying the error signal to the second filter; and
    a controller for replacing the first filter coefficients by a sum of the first and second filter coefficients in corresponding tap positions and for resetting the second filter coefficients in response to a calculation that includes a first quantity associated with the send output signal and a second quantity associated with the error signal.

16. An echo canceller with a receive path between a receive input port and a receive output port, and a send path between a send input port and a send output port, the echo canceller being used for cancelling an echo signal at the send input port which occurs in response to a receive input signal, the echo canceller comprising:

a first non-adaptive filter with first filter coefficients for generating a first replica signal, which is an estimate of the echo signal, in response to the receive input signal;

a second adaptive filter with second filter coefficients for generating a second replica signal, which is an estimate of a send output signal, in response to the receive input signal;

a first subtracter for generating the send output signal representing a difference between a send input signal and the first replica signal;

a second subtracter for generating an error signal representing a difference between the send output signal and the second replica signal, and for applying the error signal to the second filter; and a controller for replacing the first filter coefficients by a sum of the first and second filter coefficients in corresponding tap positions and for resetting the second filter coefficients in response to a calculation that includes a first quantity associated with the send output signal and a second quantity associated with the error signal, the calculation includes determining whether a ratio of the first quantity, representing a power of the send output signal, to the second quantity, representing a power of the error signal, exceeds a threshold.

17. The echo canceller of claim 16 in which the powers of the send output signal and the error signal are instantaneous signal powers of these signals averaged over a specific period of time.

18. An echo canceller with a receive path between a receive input port and a receive output port, and a send path between a send input port and a send output port, the echo canceller being used for cancelling an echo signal at the send input port which occurs in response to a receive input signal, the echo canceller comprising:

a first non-adaptive filter with first filter coefficients for generating a first replica signal, which is an estimate of the echo signal, in response to the receive input signal;

a second adaptive filter with second filter coefficients for generating a second replica signal, which is an estimate of a send output signal, in response to the receive input signal;

a first subtracter for generating the send output signal representing a difference between a send input signal and the first replica signal;

a second subtracter for generating an error signal representing a difference between the send output signal and the second replica signal, and for applying the error signal to the second filter; and a controller for replacing the first filter coefficients by a sum of the first and second filter coefficients in corresponding tap positions and for resetting the second filter coefficients in response to a calculation that includes a first quantity associated with the send output signal and a second quantity associated with the error signal, in which resetting in the second filter coefficients includes clearing the second filter coefficients after replacing the first filter coefficients.

19. The echo canceller of claim 18 in which the first filter provides essentially identical echo cancellation to that provided by the first and second filters combined before the replacing and clearing occurs.

20. An echo canceller with a receive path between a receive input port and a receive output port, and a send path between a send input port and a send output port, the echo canceller being used for cancelling an echo signal at the send input port which occurs in response to a receive input signal, the echo canceller comprising:

a first non-adaptive filter with first filter coefficients for generating a first replica signal, which is an estimate of the echo signal, in response to the receive input signal;

a second adaptive filter with second filter coefficients for generating a second replica signal, which is an estimate of a send output signal, in response to the receive input signal;

a first subtracter for generating the send output signal representing a difference between a send input signal and the first replica signal;

a second subtracter for generating an error signal representing a difference between the send output signal and the second replica signal, and for applying the error signal to the second filter; and a controller for replacing the first filter coefficients by a sum of the first and second filter coefficients in corresponding tap positions and for resetting the second filter coefficients in response to a calculation that includes a first quantity associated with the send output signal and a second quantity associated with the error signal, the controller including a spectral detector for determining whether a frequency distribution of the receive input signal is within a spectral flatness criterion.

21. The echo canceller of claim 20 in which the spectral detector prevents the replacing after the receive input signal is a narrowband signal for a time period.

22. The echo canceller of claim 21 in which the narrowband signal includes single-tones and double-tones.

23. The echo canceller of claim 22 in which the narrowband signal is a single-tone.

24. An integrated circuit including an echo canceller with a receive path between a receive input port and a receive output port, and a send path between a send input port and a send output port, the echo canceller being used for canceling an echo signal at the send input port which occurs along an echo path between the receive output port and the send input port in response to a receive input signal at the receive input port, the echo canceller comprising:

a first programmable digital filter, with a first filter coefficient memory for storing first filter coefficients, for generating a first replica signal which is an estimate of the echo signal in response to the receive input signal, such that the first filter has as impulse response which is an estimate of an impulse response of the echo path, wherein the first filter devoid of an adaptation processor;

a second adaptive digital filter, with a second filter coefficient memory for storing second filter coefficients, for generating a second replica signal which is an estimate of the echo signal in response to the receive input signal, the second filter further including an adaptation processor for adaptively modifying the second filter coefficients in response to the receive input signal and an error signal;

a first subtracter for generating a send output signal at the send output port representing a difference between a send input signal at the send input port and the first replica signal;

a second subtracter for generating the error signal representing a difference between the send output signal and the second replica signal; and a controller for performing an update operation when both (a) a ratio of a first quantity, representing a power of the send output signal, to a second quantity, representing a power of the error signal, exceeds a first threshold, and (b) a frequency distribution of the receive input signal is within a spectral flatness criterion, the controller also for performing a reset operation when a second ratio of the second quantity to the first quantity exceeds a second threshold, wherein the update operation includes replacing the first filter coefficients by a sum of the first and second filter coefficients in corresponding tap positions and clearing the second filter coefficients, thereby updating the echo canceller, and the reset operation includes clearing the second filter coefficients without changing the first filter coefficients, thereby removing drifting second filter coefficients.

25. A method of operating an echo canceller with a receive path between a receive input port and a receive output port, a send path between a send input port and a send output port, a first non-adaptive filter with first filter coefficients for generating a first replica signal, a second adaptive filter with second filter coefficients coupled to an adaptation processor for generating a second replica signal, a first subtracter for generating a send output signal at the send output port representing a difference between the send input signal and the first replica signal, and a second subtracter for generating an error signal representing a difference between the send output signal and the second replica signal, the method comprising the steps of:

modifying the second filter coefficients by using the adaptation processor in response to the receive input signal and the error signal; and modifying the first filter coefficients by accumulating the second filter coefficients on the first filter coefficients in corresponding tap positions in response to signal levels of the send output signal and the error signal, thereby updating the echo canceller.

26. The method of claim 25, further comprising clearing the second filter coefficients after modifying the first filter coefficients so that the first replica signal is essentially identical to what the second replica signal was before the modifying and clearing occurred.

27. The method of claim 25, further comprising detecting a frequency distribution of the receive input signal, and preventing the modifying of the first filter coefficients after the receive input signal has been a narrowband signal for a time period.

* * * * *